(No Model.)
J. H. KENNEDY & T. P. HALL.
SWITCH OPERATOR.
No. 288,577. Patented Nov. 13, 1883.
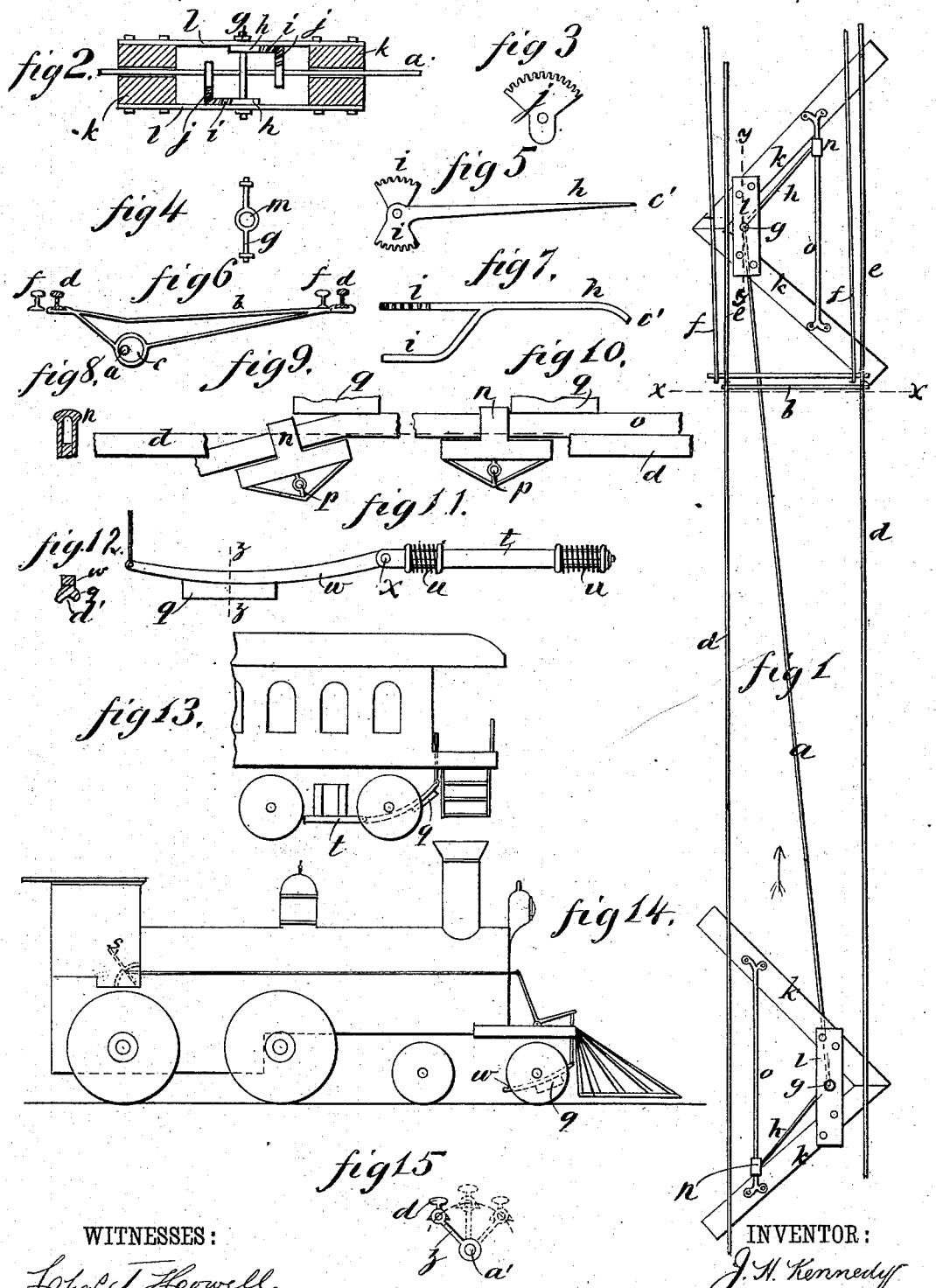
WITNESSES:
INVENTOR:
J. H. Kennedy
T. P. Hall
BY Munn & Co.
ATTORNEYS.

United States Patent Office.

JAMES H. KENNEDY, OF IONA STATION, AND THOMAS P. HALL, OF TORONTO, ONTARIO, CANADA.

SWITCH-OPERATOR.

SPECIFICATION forming part of Letters Patent No. 288,577, dated November 13, 1883.

Application filed February 26, 1883. (No model.) Patented in Canada April 12, 1883, No. 16,651.

*To all whom it may concern:*

Be it known that we, JAMES HENRY KENNEDY, of Iona Station, Ontario, Canada, and THOMAS PROCTOR HALL, of Toronto, Ontario, Canada, have invented a new and Improved Switch-Operator, of which the following is a full, clear, and exact description.

The object of the invention is to improve switch-operators, as hereinafter described, and pointed out in the claims.

Reference is to be had to the accompanying drawings, forming part of this specification, in which similar letters of reference indicate corresponding parts in all the figures.

Figure 1 is a plan view of a section of the main line, siding, and switch, with some of the apparatus by which we carry out our invention. Fig. 2 is a section on the line $yy$ of Fig. 1. Fig. 3 is a plan of one of the toothed sector-wheels on the switch-throwing shaft, with which sector-wheels the levers gear to connect with the shaft. Fig. 4 is an elevation of the fulcrum-rod of one of the levers, through which rod the switch-throwing shaft passes. Fig. 5 is a plan, and Fig. 7 a side elevation, of one of the levers. Fig. 6 is a cross-section on line $xx$ of Fig. 1, showing the shaft and eccentric by which the switch is to be shifted. Fig. 8 is a cross-section of one of the slides for shifting the levers, the lower part being broken away. Figs. 9 and 10 are side elevations of a shifting-slide, the bar on which it slides, the dog of the locomotive-truck for shifting it, and one of the rails, the slide and dog being shown in two positions. Fig. 11 is a side elevation of one of the shifting-dogs. Fig. 12 is a cross-section on line $zz$ of Fig. 11. Fig. 13 is a side elevation of part of a car, showing one of the shifting-dogs on the truck. Fig. 14 represents one of the shifting-dogs on the truck of the locomotive and the lever-gear for working it; and Fig. 15 is a diagram of lever contrivance for shifting the switch-rails, designed to prevent the rails from lodging on part throw.

The line $a$, Fig. 1, represents a shaft, which has at the switch-bar $b$ an eccentric, $c$, Fig. 6, for shifting the switch-rails $d$ to and fro between the main line $e$ and the siding $f$, the said shaft being geared at the points $g$ with levers $h$, (indicated by the lines $h$ in Fig. 1, and shown in Figs. 2, 5, and 7,) said levers being pivoted on the fulcrum-rod $g$, and said levers being geared by their toothed sectors $i$ with the segmental wheels $j$ on the shaft $a$ in duplicate and reverse arrangement, which relieves the shaft of shocks to some extent when the levers are shifted quickly. The shaft $a$ has bearings each side of the lever-connections in the timbers $k$, and the timbers are connected by top and bottom plates, $l$, in which the fulcrum-rod $g$ has bearings, and is secured in place by nuts screwed onto its ends. The fulcrum-rod $g$ has a hole in the center, through which the shaft $a$ passes. The levers $h$ connect with slides $n$ on bars $o$ by extending through an eye, $p$, at the under side of each slide, and these slides are to be shifted along the bars $o$, for shifting the switch, by dogs $q$, attached to the locomotive or hind car truck, so as to be let down by the engineer or brakeman by means of a lever, $s$, in the cab when it is required to shift the switch by them, the bars being located a little higher than the rails, suitably for supporting the slides in the range of the dogs when let down to engage the slides. The bars $o$ turn downward, as shown in Fig. 9, at the ends, for dropping the slides so as to escape from the dogs, and the levers $h$ are curved at the ends $c'$, which are in the eyes $p$ when the slides pass down the inclines, and allow the slides to descend without binding on the levers. When the dogs are let down to engage with the slides, they will drop far enough to engage the slides on these inclines and rise with them to the level of the bars $o$, in which position the dogs will be held by the bars $o$, so as to escape over the slides when the said slides pass down the inclines again at the other end of their range.

It will be seen that with a train going toward the switch in the direction of the arrow in Fig. 1 a dog let down from the left-hand side of the locomotive will engage slide $n$ and shift it along to the other end of the bar $o$, which will shift the switch to the siding $f$, onto which the train will run. Then, if a similar dog is let down from the hind truck of the hind car, but on the right-hand side of the truck, after it has passed the switch, it will engage the other slide $n$, which was shifted over toward the switch when the shaft was turned by the engine-dog, and shift the switch to the main line again. Then, when the train backs from the siding onto the main line again, the dog on the hind truck that closed the switch by shifting it to the main line when the train went onto the siding will open it by shifting it to the siding, and as the dog on the engine that first set the switch to the siding passes slide $n$ (shown at the bottom of the figure) it will shift it back into the position shown in the drawings, the switch being thus always set to the main line, except when switching a train.

The dogs $q$ are attached to sliding stocks $t$, that are cushioned by springs $u$, to lessen the shocks as much as possible, said dogs being connected to them by arms $w$, jointed to them, so as to swing up and down, said arms being curved downward from their pivots $x$, to enable the stocks $t$ to be lodged enough higher than the slides $n$ to pass over them without contact, and the dogs are grooved on the sides $d'$, bearing on the bars $o$, for riding thereon more securely than if flat.

The bar $w$ is designed to be connected to the truck. It may be, by means of pendants, fastened to the under side of the same and adapted to receive and support the part $t$, to which said bar is jointed.

We propose to connect the switch-rails to rock-arms $z$, arranged on pivots $a'$, fixed on the tie, so as to travel in the arc represented in Fig. 15, in order that after having passed the vertical line, to which the shifting-gear will never fail to throw them, they will be sure to go the rest of the way by gravity in case the gear should fail to act to the end of the movement.

Having thus fully described our invention, we claim as new and desire to secure by Letters Patent—

1. The combination, with the switch-rails and switch-bar, of the slides $n$, levers $h$, shaft $a$, and eccentrics $c$, said slides being arranged in the path of the dogs on the train in command of the attendant, as described.

2. The combination, with the siding $f$, main line $e$, and switch-rails $d$, of the shaft $a$, carrying segmental wheels $j$, the switch-bar $b$, the eccentric $c$, the levers $h$, having toothed sectors $i$, and fulcrumed on rods $g$, and the slides $n$ on bars $o$, whereby the switches may be shifted by dogs $q$ on the locomotive or rear truck, as described.

3. The levers $h$ and the shaft $a$, in combination with the duplex and reversely-arranged gears $i\ j$, as and for the purpose specified.

4. The combination, with the slides $n$, of the slide-bars $o$, arranged upon the track, and having inclines at the ends for the escape of the slides, and the dogs carried by the locomotive, substantially as described.

5. The levers $h$, having curved ends $c'$, in combination with the slides $n$ and the bars $o$, having end inclines, as and for the purpose set forth.

6. The combination, with the truck-dogs $q$, mounted on arms $w$, of the slides $n$ and the shifting-gear, as and for the purpose specified.

7. The combination of dogs $q$ on the trucks with the slides $n$, bars $o$, and the shifting-gear, said slides being grooved in the side $d'$, bearing on the bars $o$, substantially as described.

JAMES H. KENNEDY.
THOMAS P. HALL.

Witnesses:
GEO. H. SMITH,
E. A. HALL.